UNITED STATES PATENT OFFICE.

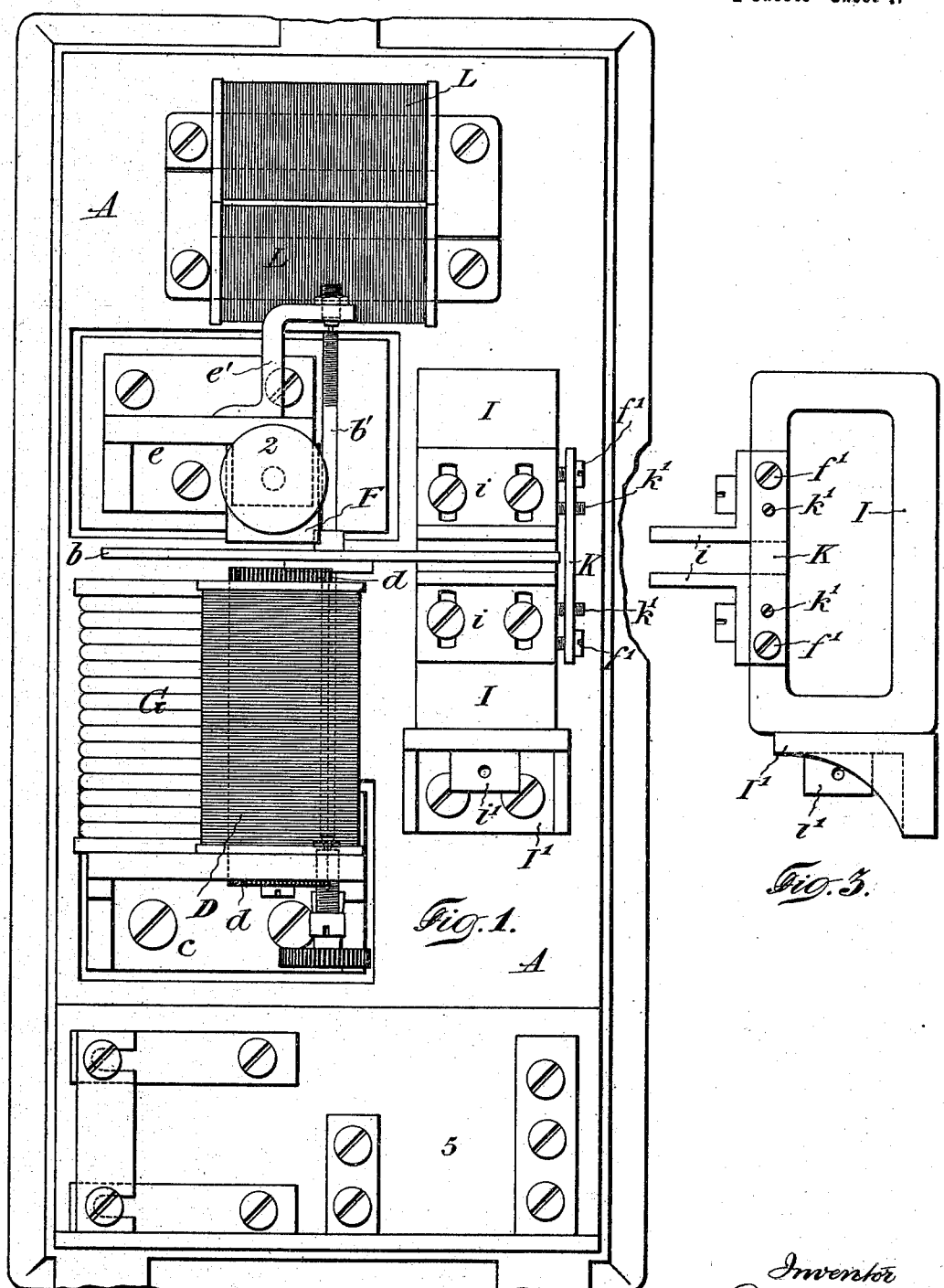

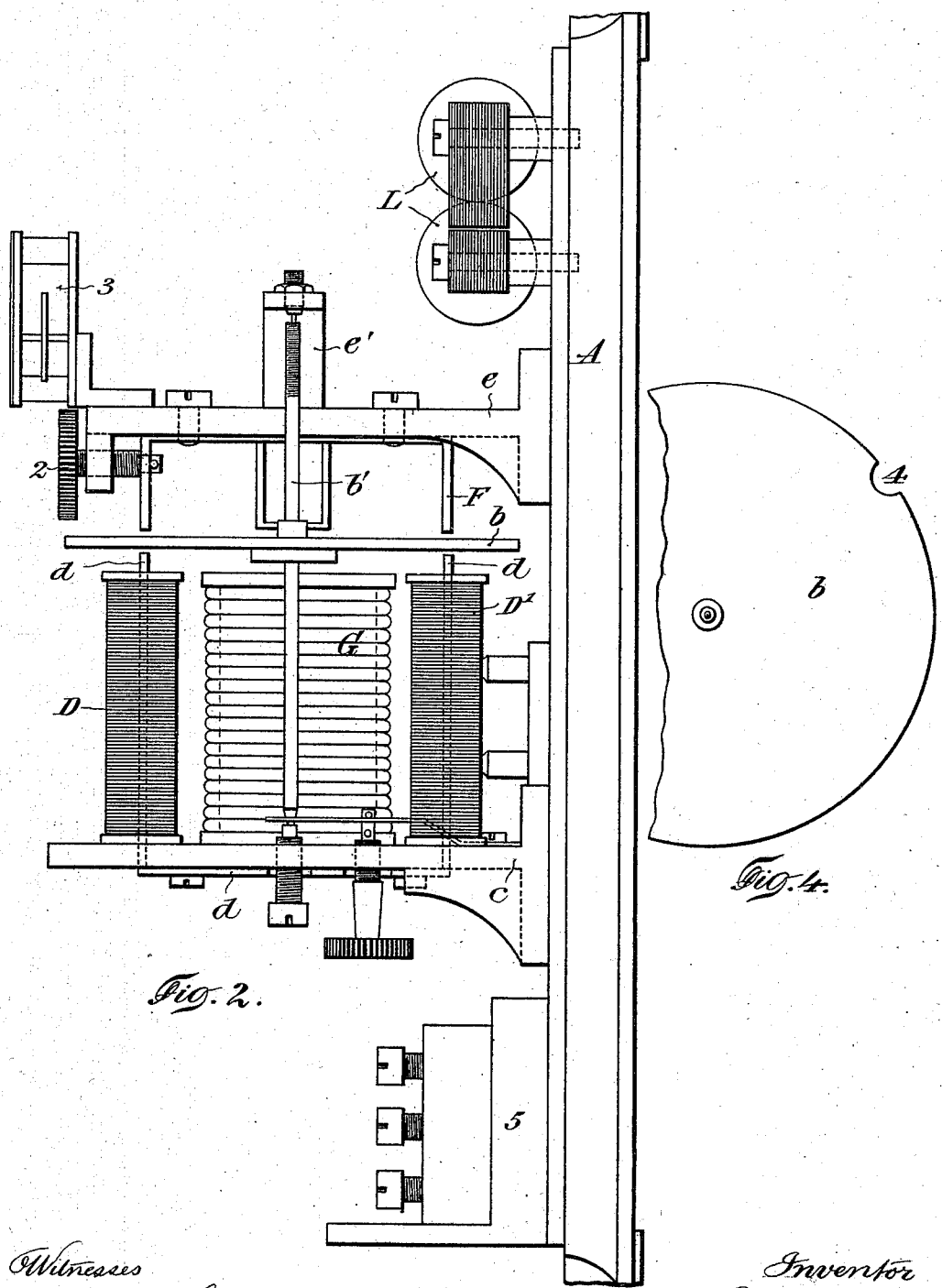

ALBERT PELOUX, OF GENEVA, SWITZERLAND, ASSIGNOR TO SOCIÉTÉ POUR L'EXPLOITATION DE COMPTEURS ÉLECTRIQUES, RITTENER & CO., OF SAME PLACE.

MOTOR-METER FOR ALTERNATING CURRENTS.

SPECIFICATION forming part of Letters Patent No. 681,002, dated August 20, 1901.

Application filed March 8, 1901. Serial No. 50,346. (No model.)

*To all whom it may concern:*

Be it known that I, ALBERT PELOUX, of Geneva, Switzerland, have invented certain new and useful Improvements in Motor-Meters for Alternating Currents, of which the following is a specification.

The motor-meter according to my invention is based on the principle established by Farraris, wherein a cylinder or disk of metal may be inductively influenced by two alternating currents differing in phase from one another by a fraction of a period, whereby the said cylinder or disk is caused to rotate.

In carrying out my invention I provide a disk of metal secured to a shaft and fixed to rotate in suitable bearings. I employ a main series coil having an independent core and two pressure or shunt coils, one on either side of the series coil, having independent cores and an armature to complete the magnetic circuit through said cores. I also employ a self-induction coil in the circuit of and in series with the shunt-coils and a permanent magnet between whose poles the disk revolves and means for regulating the magnetic reluctance of the said magnet, all of which will be hereinafter more particularly described.

In the drawings, in which I have illustrated the preferable form of my invention, Figure 1 is a front elevation, and Fig. 2 a side elevation, of the meter. Fig. 3 is a side elevation of the parts I, *i*, and K of Fig. 1; and Fig. 4 is a partial plan of the disk.

A represents a base, which may be secured to the wall or other suitable support. The bracket *c*, supported by and from the base A, carries the coils D, D', and G. The shunt-coils D D' are composed of fine wire and provided with laminated iron cores *d* and an integral yoke *d'*, which preferably passes through the bracket *c*. The series coil G is composed of heavy wire and is also provided with an iron core, which, however, does not pass through the bracket *c* and is therefore independent of the yoke *d'*, connecting the shunt-coil cores. A bracket *e* is also connected to the base A. This bracket *e* carries an elongated inverted-U-shaped armature F, conforming in width to the distance between the centers of the shunt-coils and adapted to be moved by the thumb-screw 2 to vary its position in relation to the cores *d* of the said shunt-coils. This armature F closes the magnetic circuit of the shunt-coils, and just sufficient space is provided between the said armature and the ends of the shunt-coil cores *d* for the revolution of the metallic disk *b*, which is mounted on a shaft *b'*, secured in adjustable bearings, the lower one of which is in the bracket *c* and the upper one in an arm *e'* integral with the bracket *e*.

L is a self-induction coil secured to the base A and electrically connected in series with the shunt-coils D D'. The magnetic poles of the coils D, D', and G are combined, so as to aid each other in causing the disk *b* to rotate. The motive effect of the coils varies as the sine of the angle corresponding to the difference in phase of the shunted current and the main current, the maximum effect being obtained with a difference of ninety degrees, and for this purpose the induction-coil is employed. The upper end of the shaft is threaded, so that, if desired, suitable gearing may be operatively connected therewith for the purpose of actuating a registering mechanism 3, which, however, forms no essential part of my invention.

*i i* are the adjustable poles of a permanent magnet I, which is fixed to a support I' by the screw *i'*, the support being screwed to the base A. The disk *b* revolves between the adjustable poles *i i* of the magnet, and the object of the magnet is to produce Foucault currents in the disk, which tend to retard the rotation thereof and also to make the same proportional to the current passing in the coils D, D', and G. The periphery of the disk *b* between the magnets comes adjacent to an iron plate K, fixed to the poles *i i* by screws *f' k'*, by which the said iron plate may be adjusted in its relation to the said poles to vary the influence of the magnet on the disk *b* by an increase or decrease of the magnetic reluctance of the magnet.

By displacing the armature F in the direction of rotation of the disk a constant motive couple is produced and may be used to compensate for the friction of the pivots and the mechanism of the registering apparatus.

The disk *b* may be provided with the notch 4 in its periphery, whereby the said disk may be stopped when no current is traversing the coil G. The terminal block 5 may be conveniently secured to the lower part of the base A.

I claim as my invention—

1. In a motor-meter for alternating currents, the combination with a revoluble disk of metal, a shaft and suitable bearings therefor, of a pair of shunt-coils having cores and a yoke common to the cores of both of said coils, an armature completing the magnetic circuit of said shunt-coil cores, a series coil placed between the said shunt-coils, a core within said series coil which is independent of the magnetic circuit of the shunt-coil cores, and means for varying the position of the said armature in relation to the said disk and coils, substantially as specified.

2. In a motor-meter for alternating currents, the combination with a revoluble disk of metal, a shaft and suitable bearings therefor, of a pair of shunt-coils and a self-induction coil both in series in the shunted circuit, cores within said shunt-coils, a yoke integral with said cores, an armature to complete the magnetic circuit of the shunt-coil cores, a series coil placed between the said shunt-coils and having a core independent of the said magnetic circuit of the shunt-coil cores, all of the said coils being on one side of the disk and the said armature on the other side of the disk, and means for varying the positions of the said armature in relation to the said disk and coils, substantially as specified.

3. In a motor-meter for alternating currents, the combination with a revoluble disk of metal, a shaft and suitable bearings therefor, of a pair of shunt-coils and a self-induction coil both in series in the shunted circuit, cores within said shunt-coils, a yoke integral with said cores, an armature to complete the magnetic circuit of the shunt-coil cores, a series coil placed between the said shunt-coils and having a core independent of the said magnetic circuit of the shunt-coil cores all of the said coils being on one side of the disk, and the said armature on the other side of the disk, means for varying the positions of the said armature in relation to the said disk and coils, a permanent magnet between whose poles the outer portion of the said disk passes, and means for regulating the magnetic reluctance of said magnet, substantially as specified.

4. In a motor-meter for alternating currents, the combination with a revoluble disk of metal, a shaft and suitable bearings therefor, of a pair of shunt-coils and a self-induction coil both in series in the shunted circuit, cores within said shunt-coils, a yoke integral with said cores, an armature to complete the magnetic circuit of the shunt-coil cores, a series coil placed between the said shunt-coils and having a core independent of the said magnetic circuit of the shunt-coil cores, all of the said coils being on one side of the disk, and the said armature on the other side of the disk, means for varying the positions of the said armature in relation to the said disk and coils, a permanent magnet between whose poles the outer portion of the said disk passes, and a plate extending across the poles of said magnet on the edge face thereof and adapted to be adjusted to vary the magnetic reluctance of said magnet, substantially as set forth.

In testimony that I claim the foregoing as my invention I have signed my name in presence of two subscribing witnesses.

ALBERT PELOUX.

Witnesses:
E. IMER-SCHNEIDER,
TH. IMER.